J. P. CURRY.
BAG TYING MACHINE.
APPLICATION FILED APR. 9, 1912.
1,074,587.
Patented Sept. 30, 1913.
8 SHEETS—SHEET 7.
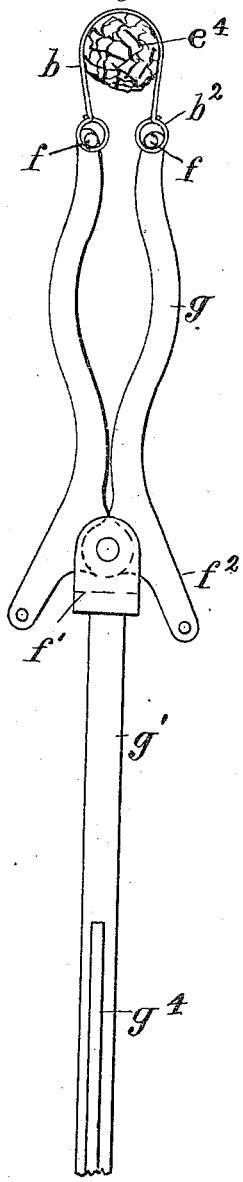
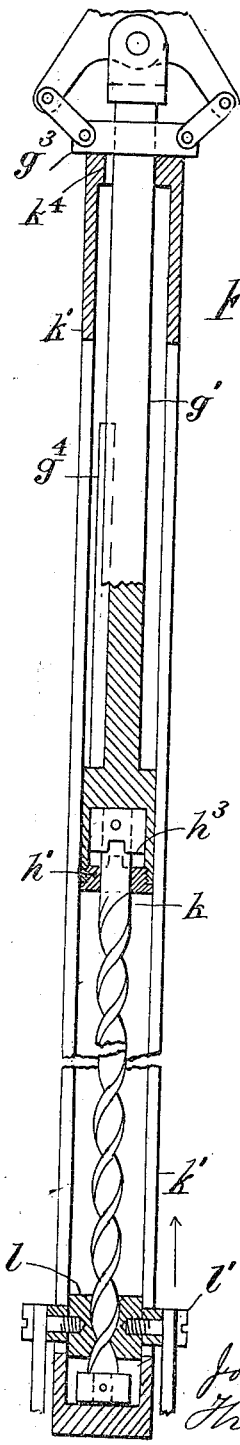
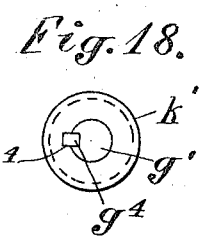
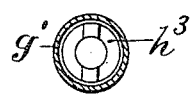

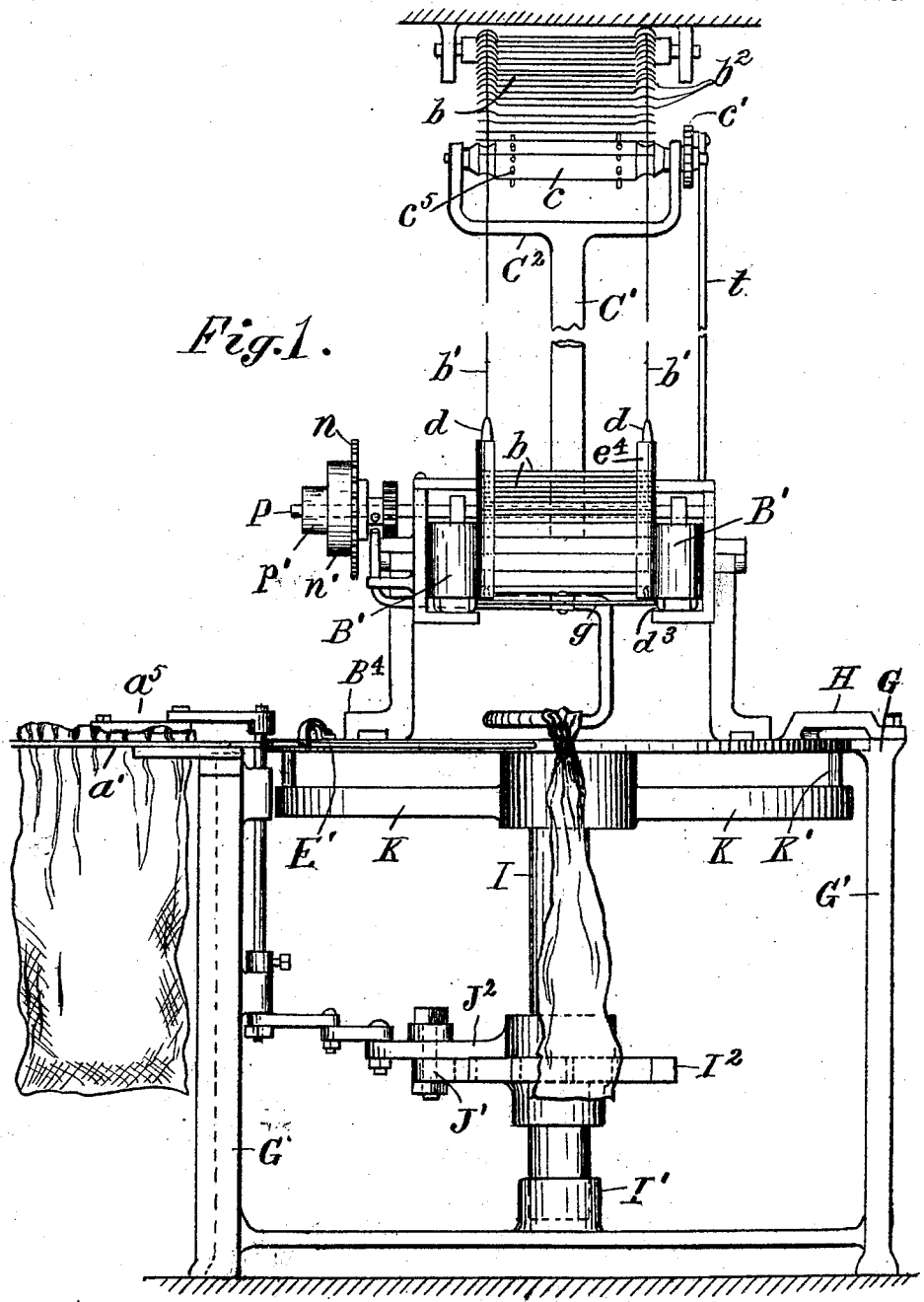

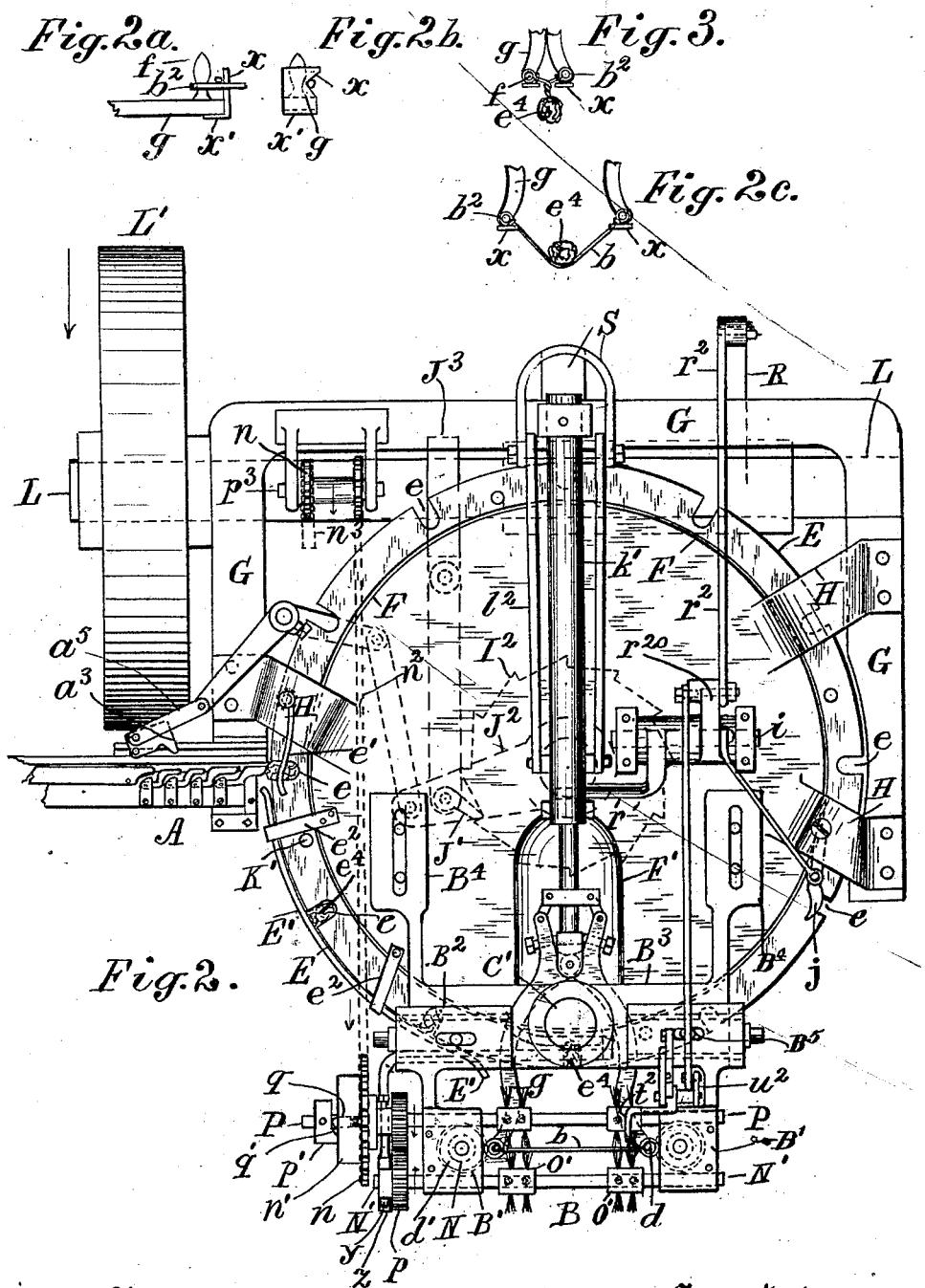

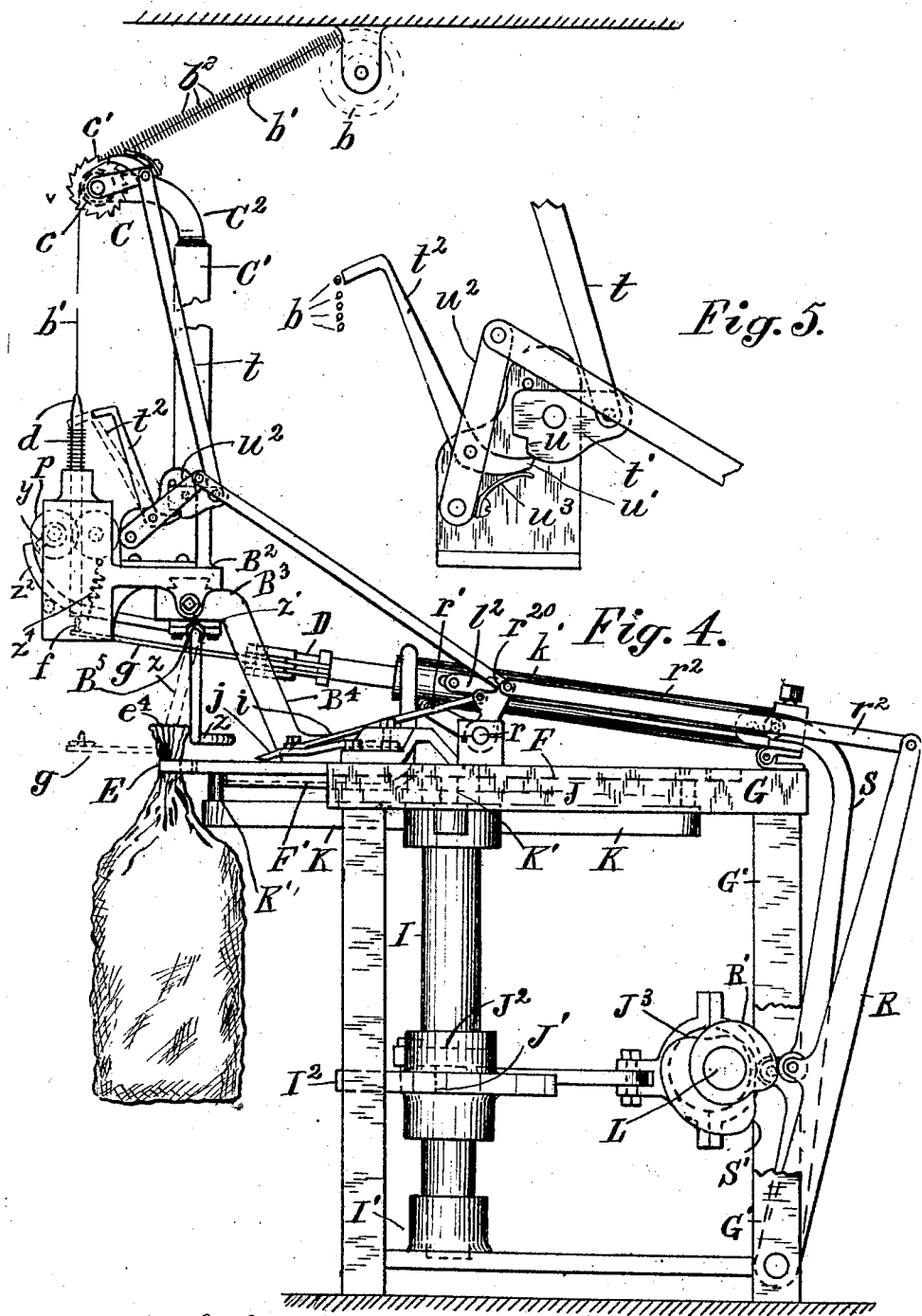

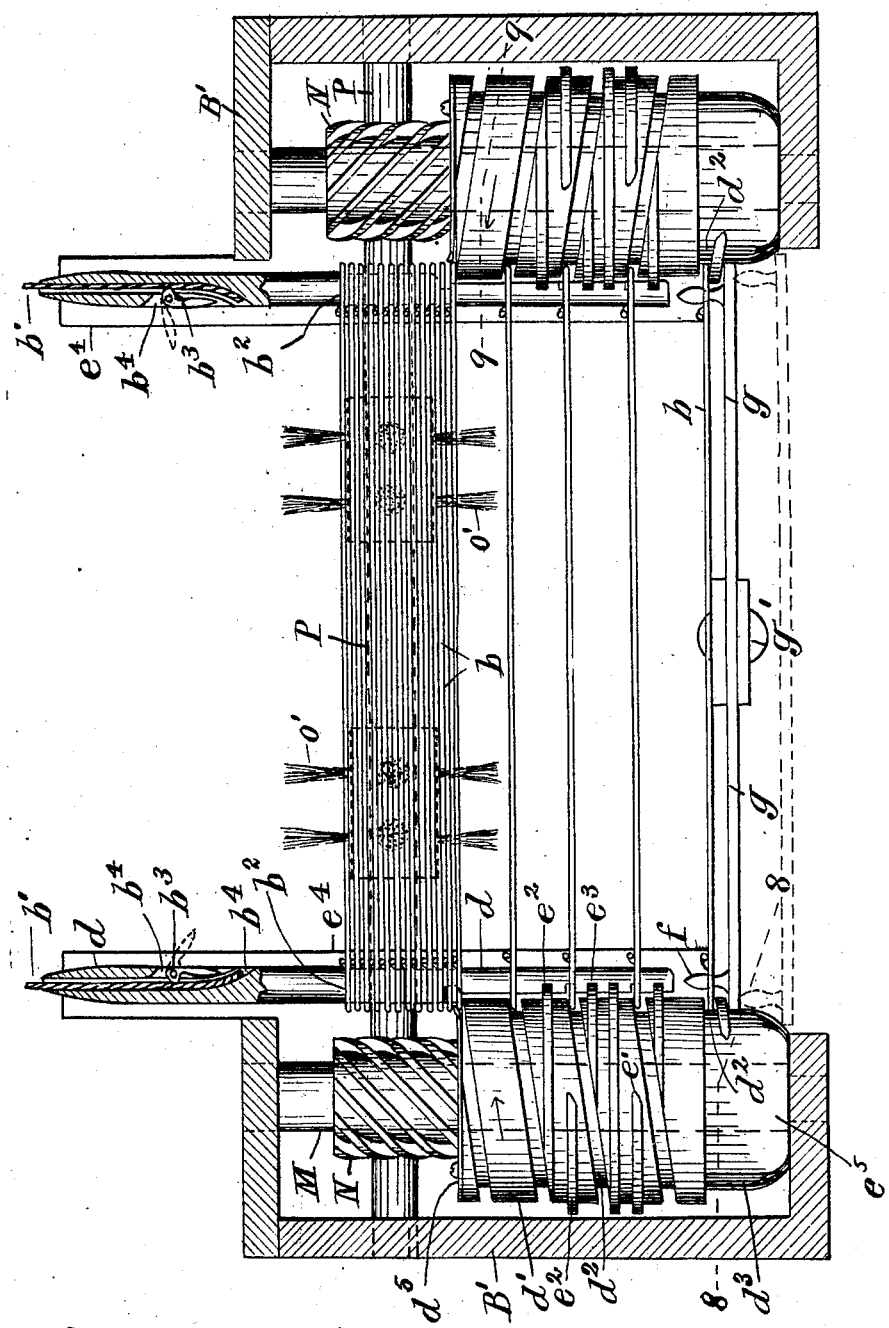

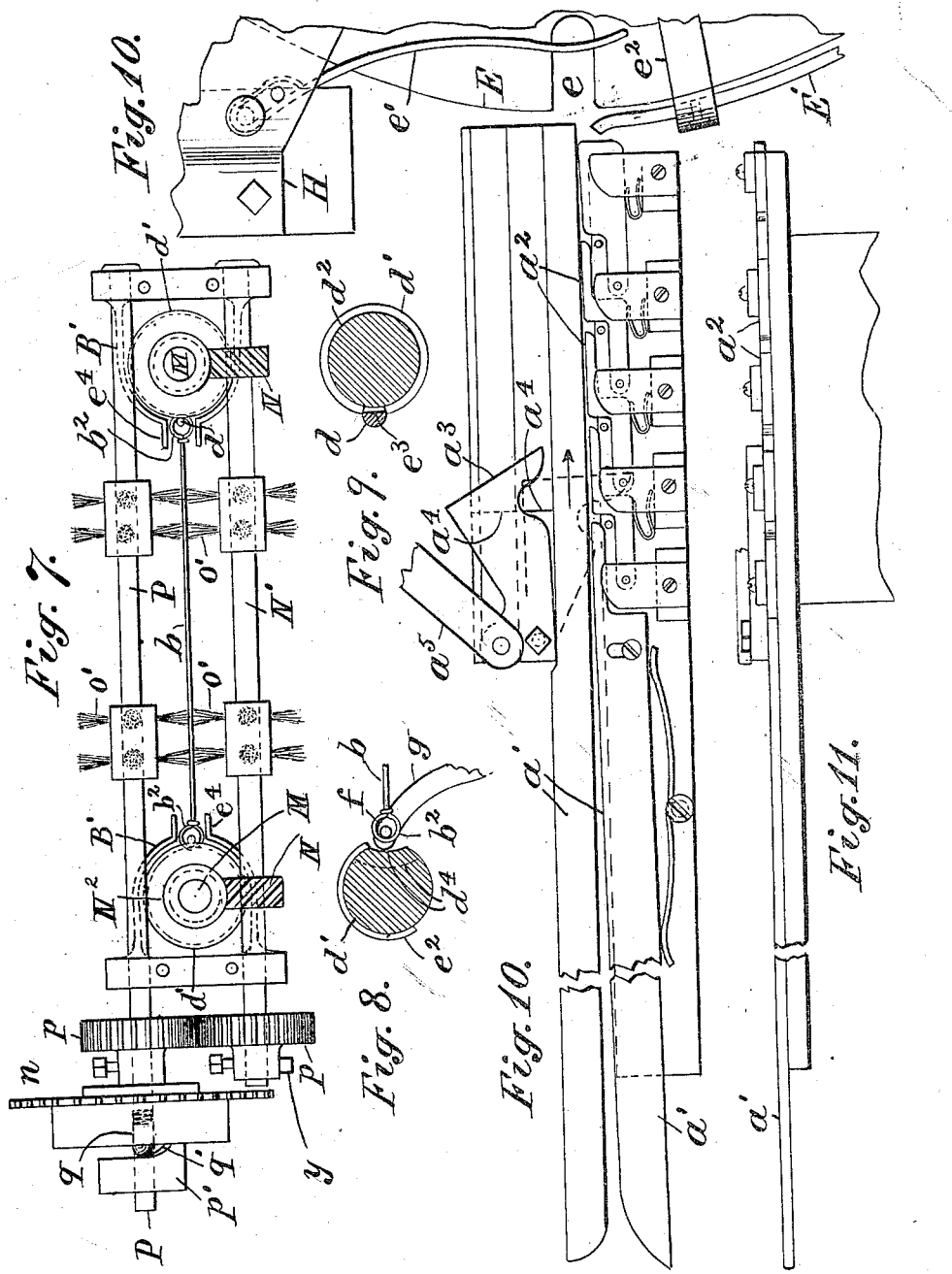

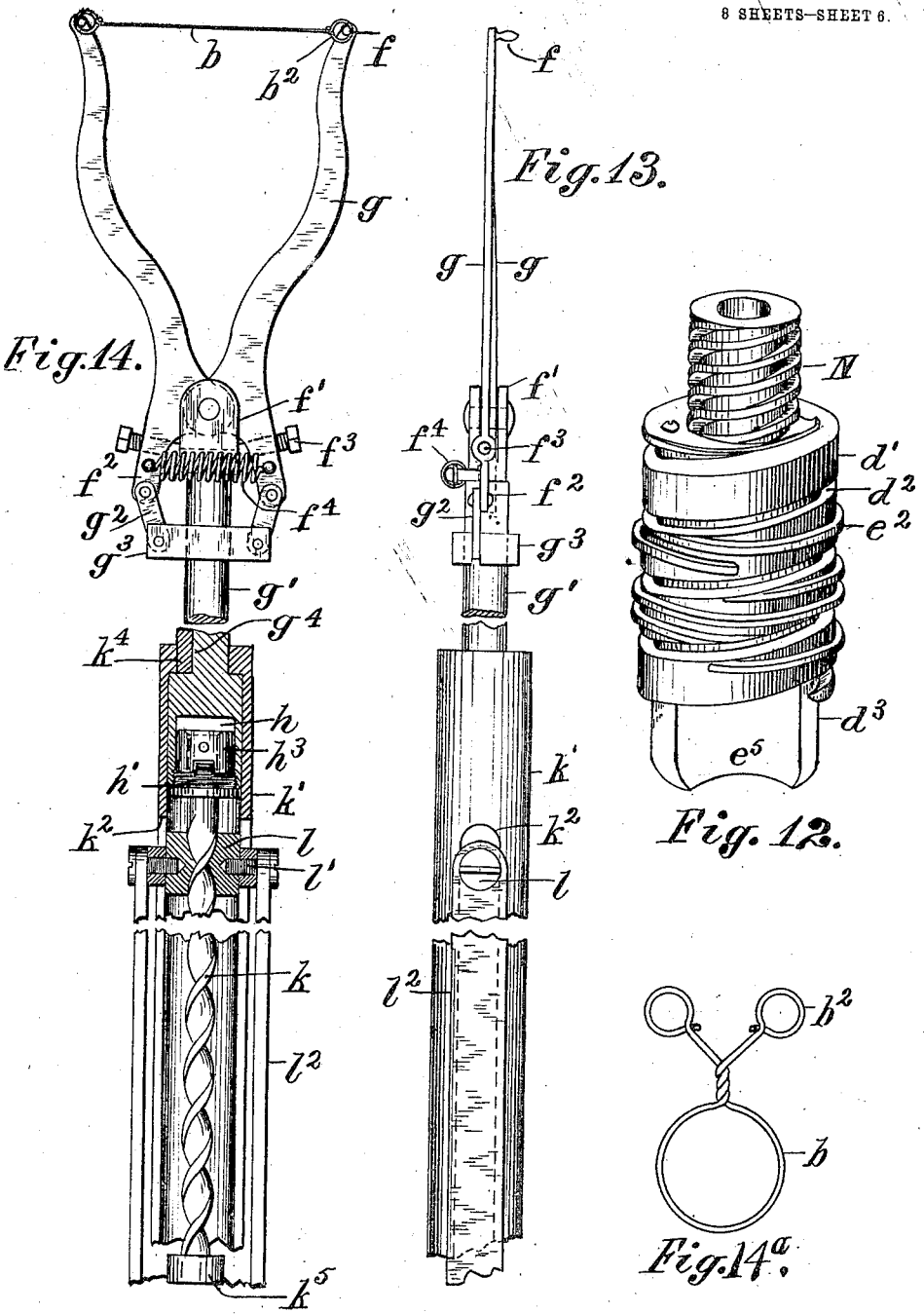

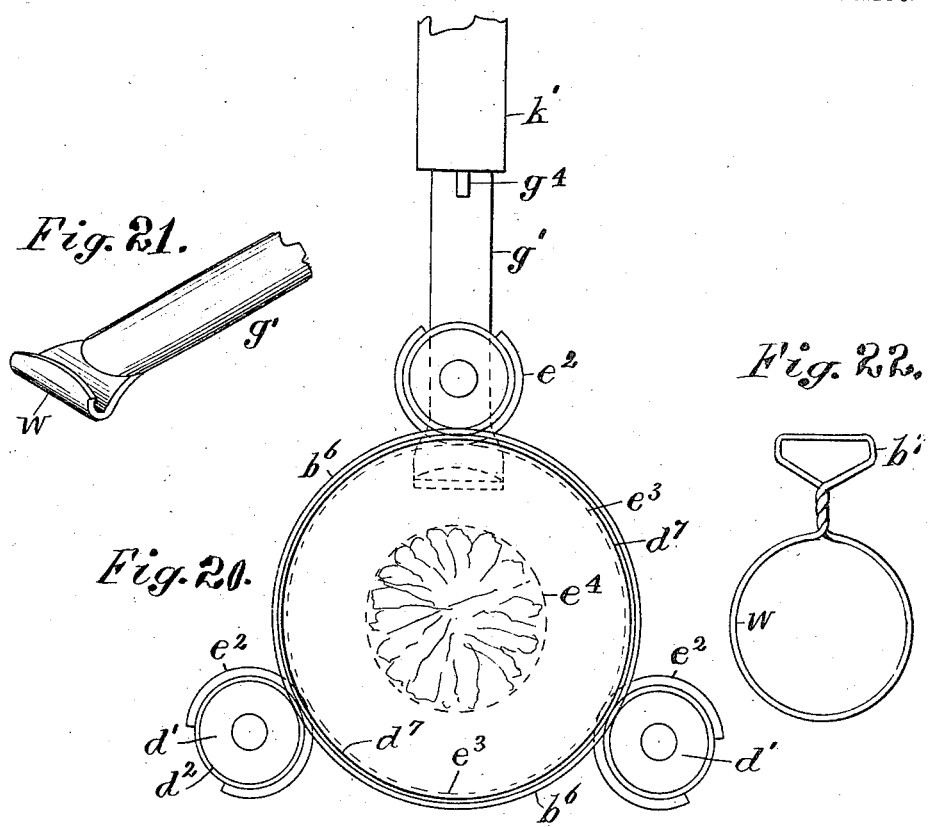
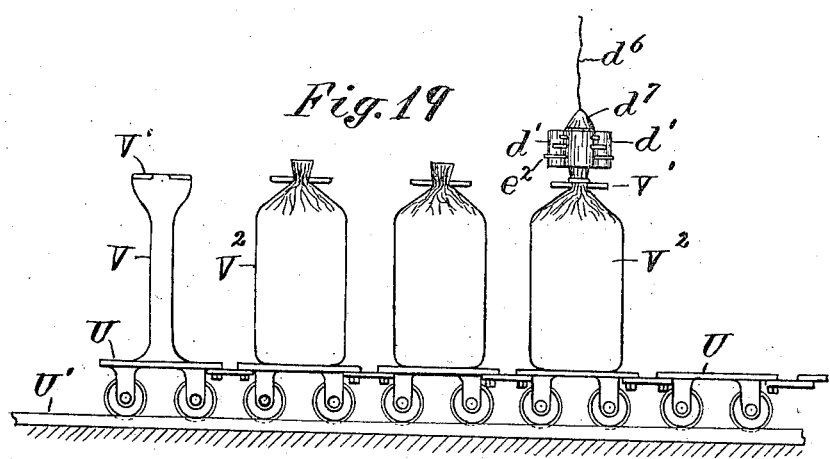

UNITED STATES PATENT OFFICE.

JOHN P. CURRY, OF NEW YORK, N. Y.

BAG-TYING MACHINE.

1,074,587.
Specification of Letters Patent.
Patented Sept. 30, 1913.

Application filed April 9, 1912. Serial No. 689,599.

*To all whom it may concern:*

Be it known that I, JOHN P. CURRY, a citizen of the United States, residing at 62 West Eighty-ninth street, New York, county of New York, and State of New York, have invented certain new and useful Improvements in Bag-Tying Machines, fully described and represented in the following specification and the accompanying drawings, forming a part of the same.

This invention relates to an apparatus which operates in an automatic manner upon bags and ties when supplied to the machine, to wrap a wire-tie around the neck of the bag and to twist the wire in such manner as to tightly tie the bag, and operating also to leave a portion of the wire projecting beyond the twist so as to be readily grasped by the fingers for untying the bag.

The invention may be operated upon bags either empty or filled, empty bags having a filling-valve in the bottom being commonly tied at the neck before they are filled.

The mechanism illustrated provides means for crimping the neck of a bag and for then transferring the bag from the crimper to the tying devices, for delivering a wire-tie to the neck of the bag, for grasping the same by means of a twister and twisting it tightly on the bag-neck, and finally for ejecting the bag-neck from the carrier which guides it through the machine.

The apparatus may be used with either straight ties having loops at the ends by which the twister may readily grasp them, or with circular ties consisting of endless rings larger than the bag-neck and adapted to drop over the same and then be twisted to pinch them thereon.

The invention includes a special construction of a tie-deliverer for delivering wire-ties whether straight or circular successively to the twisting mechanism, and for engaging the twister with the tie, then pulling it laterally upon the bag-neck and finally twisting the tie thereon.

It also includes a special means of feeding the ties to the tie-deliverer only as fast as they are utilized by the deliverer.

In the annexed drawing, Figure 1 is a front elevation of a machine embodying the invention; Fig. 2 is a plan of the same; Fig. 2ª is a side view, and Fig. 2ᵇ an end view of one of the fork-arms; Fig. 2ᶜ shows in plan the ends of the fork-arms with a tie applied to a bag-neck; Fig. 3 shows the same parts with the tie fully twisted; Fig. 4 is a side elevation of the machine; Fig. 5 is an elevation upon a larger scale of the safety pawl for the tie-feeder; Fig. 6 is a front elevation upon a larger scale of the tie-delivering device with the casings of the delivery-screws broken away; Fig. 7 is a plan of the same with the top of the casing removed; Fig. 8 is a cross-section on line 8—8 in Fig. 6; Fig. 9 is a cross-section on line 9—9 in Fig. 6; Fig. 10 is a plan, and Fig. 11 a side elevation of the bag crimper; Fig. 12 is a perspective view of one of the tie-delivery screws; Fig. 13 is an edge view of the tying fork and its twisting mechanism; Fig. 14 is a plan of the same with the shell of its tubular guide and contained parts in section where hatched; Fig. 14ª shows a straight tie after twisting upon the bag-neck; Fig. 15 shows the twister-spindle and shank retracted with the parts in section at the center line where hatched; Fig. 16 shows the twister-jaws closed to twist the tie; Fig. 17 is a plan of the coupling secured in the twister-shank; Fig. 18 shows the front end of the tube and twister-shank; Fig. 19 is an elevation of a modified form of carrier and deliverer for tying filled bags by twisting a circular ring upon the bag-neck; Fig. 20 is a plan of the means for feeding and twisting the circular ties; Fig. 21 is a perspective view of the hook for twisting the circular ties; and Fig. 22 shows one of the circular ties after it is twisted upon the bag-neck.

In Fig. 2, the device for crimping the neck of the bag is marked collectively A, the device for delivering the ties is marked collectively B, and in Fig. 4 the twister is marked collectively D. In the other figures the details of these devices are marked with small letters.

The crimper A and the tie-deliverer B are shown located 90 degrees apart near the edge of an annular carrier-ring E, which is provided with a series of notches *e* suited to receive the crimped neck of the bag and adapted to register successively with the crimper and with the tie-deliverer. The ring E is rotated around a circular table F which is supported within the movable ring E upon a frame or stand G by brackets H. Only one of these brackets is shown in Fig.

4, to avoid obscuring the drawing. An upright shaft I is fitted in a bearing I' in the bottom of the stand and in a bearing J shown in Fig. 4 in the center of the table F, and operates to carry the ring by means of a four-armed spider K having studs K' projecting upwardly beyond the margin of the table into the ring E. A driving-shaft L driven by a pulley L' is mounted upon two of the standards G' of the frame G. The carrier and the shaft I are rotated intermittingly by a ratchet-wheel I² secured upon the shaft, and a pawl J' pivoted upon an arm J² and oscillated by an eccentric J³ on the driving-shaft. A shield E' is connected to the table F by arched brackets e² and held just outside the margin of the carrier between the crimper and the tie-twister so as to confine the bag-necks in the notches during their transfer.

The crimper is shown in Fig. 10 as a pair of longitudinal cheeks a' pressed plastically toward one another radially to the carrier so as to deliver into the notches e, and it also has spring-dogs a² to compress the material of the bag-neck more effectually. A pusher a³, having a pivot upon a slide a⁴ at one side of the cheek a', is connected with a reciprocating link a⁵ which operates when pulled at a suitable moment to first throw the pusher across the cheeks, as shown by the dotted lines in Fig. 10, and then to press it toward the rim of the carrier, thus forcing the bag-neck from the grip of the dogs a² into the notch e and crimping it effectually therein. The link a⁵ is connected to the arm J² to be reciprocated thereby. At the crimper, an elastic fender e' is held an inch or two above the carrier across the bottom portion of the notch e to prevent the bag-neck from leaning over the carrier where it projects above the notch. The pawl j' carries the notches e step by step from the crimper to the tie-deliverer B which is shown adapted to receive straight ties with loops b² at their opposite ends, such as are shown in Figs. 3 and 7. As the carrier turns, the bag-neck slips away from the fender and passes beneath the bracket e² which carries the shield E'. The fender e' leaves the bag-neck standing upright in the notch so that when the tie is looped about it it may not interfere with the twister-arms which twist the tie, the ends of which rotate close to the bag-neck and would be fouled thereby if the bag-neck leaned materially toward the twister. The deliverer for delivering such ties to the twister is shown also in Fig. 6, and consists of two cylinders of special construction in casings B' which are adjustable to and from one another by slotted feet B². These feet are adjustable by screws B⁵ upon a stand B³ having feet B⁴ bolted to the table F and slotted to move the tie-deliverer radially of the table. A column C' is extended upward from the stand, being fastened thereto by a bottom flange. Fig. 4 shows an elevated coil of such ties b having cords b' extended through the loops b² in the ends of the ties, these cords b' being carried over a feed-roller c having a ratchet-wheel c' upon one end and mounted in bearings upon a fork C² upon the column C'.

The cords are connected at their lower ends with the tops of guides d which are adapted to receive the loops upon the ties and extend downwardly to a point where the ties may be delivered to the jaws of a twister. These jaws are shown as pointed studs affixed to one side of the twister-arms g. These guides d require support in a peculiar manner, as the ties fall freely upon their upper ends, and move freely over their whole length to be delivered from their lower ends. Such support and the successive delivery of the ties is effected by the rotary screws d' having a continuous spiral groove d² to engage the extreme ends of the ties and carry them downwardly upon the guides for delivery. The screws have projecting collars e² to engage notches e³ in one side of each guide d, to support it.

Collars are provided more numerous than the coils of the spiral thread, so that although each is interrupted by the thread at their various points of intersection marked e', to permit the passage of the ties, some of them are always in engagement with the notches e³ and thus support the weight of the guide. (See Fig. 6.)

The casing B' has flanges e⁴ to embrace the opposite sides of the loops B² upon the ties, and as a plurality of the ties constantly embraces the guides, the guides are held in a vertical position between such flanges, and in engagement with the collars e² upon the screws. The screws are rotated by spiral-gears N² driven by similar gears N upon the shaft N', shown in Figs. 3 and 7, and the grooves d² terminate simultaneously at the bottoms of the screws when thus rotated, so as to drop both ends of a tie at the same time. (See d² near the bottom of each screw.) Each screw rotates upon a vertical stud M in the casing B', and has a hub d³, at its lower end which has a notch e⁵ upon one side, as shown in Figs. 7 and 12, to permit the moving outwardly of the jaws f, which grasp the tie when delivered. The studs f are shown in Fig. 6 held adjacent to the bottoms of the guides d by fork-arms g, pivoted upon a shank which is connected by a self-opening coupler to a spiral twister-spindle k.

The stand B³ for the tie-deliverer is sustained at some distance above the ring E to permit the neck c⁴ of the bag, which projects considerably above the carrier E, to move under the stand to the tying position.

and the studs $f$ are thus required to receive the ties at a level above the top of the bag-neck, and to then lower the tie to the level of the carrier so as to twist the tie about the neck close to the carrier. The mechanism for operating the jaws must therefore elevate them to the delivery-screws $d'$, as shown in Fig. 4, to receive the tie, then lower them to the level of the carrier E, as indicated by the dotted lines $g$ in Fig. 4, then draw the fork-arms backwardly with the tie to the bag-neck $e^4$ without rotating the arms, then draw the jaws together to loop the tie around the bag-neck as shown in Fig. 16, and finally rotate the fork-arms to twist the tie. These movements are effected by the following mechanism. The shank and the twister-spindle are movable longitudinally within a casing or tube $k'$ which is hinged at its rear end to the frame G, as shown in Figs. 3 and 4. A rock-shaft $r$ is mounted upon the table F adjacent to the forward end of the tube and carries a crank $r'$ which is extended beneath the tube to raise and lower the twister as required. The rock-shaft is oscillated by a link-connection $r^2$ to a cam-lever R and cam R' upon the shaft L. (See Fig. 4.) A nut $l$ is fitted movably upon the spiral spindle $k$ and is reciprocated within the tube $k'$ by links $l^2$, cam-lever S and cam S'. The links $l^2$ are connected to the nut by pivot-bolts $l'$ operating through slots $k^2$ in opposite sides of the tube. As the reciprocation of the nut operates to twist the spindle alternately in opposite directions while the shank of the tie-twister is required to twist only in one direction, and to move backwardly for a considerable distance before twisting the tie, it is necessary to form a detachable connection between the twister spindle and the shank, and this is effected by securing a coupling formed as a toothed coupler-block $h'$ rigidly within a bore $h$ at the end of the shank within the tube. The forward end of the twister-spindle $k$ is made cylindrical and extended through the coupling $h'$ and provided upon its end, within the bore $h$, with a coupler-head $h^3$ having notches adapted to engage the teeth upon the coupling $h'$. The rear end of the spindle is provided with a collar $k^5$ to prevent the shank and spindle from being pulled out of the tube. The bore $h$ is made long enough to permit a longitudinal movement of the coupler-head $h^3$ within the bore sufficient to clear the notches from the teeth of the coupling, as shown in Fig. 15 and the shank $g'$ is provided with a feather $g^4$ which fits within a keyway $k^4$ in the neck of the tube $k'$, see Fig. 15, and this feather extends along the rear portion of the shank $g'$ sufficiently to hold the shank from turning when it is first retracted, and while the wire-tie is being drawn backwardly to loop it about the bag-neck, and it then clears the keyway $k^4$, as shown in Fig. 15, permitting the shank to turn with the twister-spindle $k$.

After each tie is twisted upon the bag-neck, the fork-arms are advanced and elevated to receive another tie, and during such advance movement they are not required to rotate, and the rotation is avoided by the disconnection of the coupler upon the inner end of the shank which is produced by the first forward movement of the spiral-spindle $k$ when its backward movement is reversed by the links $l^2$. (See Fig. 15.) Such forward movement detaches the teeth of the coupler and permits the spiral-spindle to rotate without turning the shank $g'$, and finally to push the shank forward to the desired position. In such forward movement the feather $g^4$ is reëngaged with the keyway $k^4$ and holds the twister-arms in a level position, as required. When the twister-arms have received a tie from the tie-deliverer and have been lowered, the links $l^2$ are retracted and the first effect of the nut upon the spiral-spindle is to pull the coupler-head $h^3$ into engagement with the coupling $h'$. (See Fig. 14.) The shank and the twister-spindle being thus connected, the twister-spindle cannot rotate so long as the feather is engaged with the keyway, and the backward movement of the nut $l$ therefore pulls the shank backwardly without rotation, until the feather slips from the keyway. Before such non-rotative backward movement is completed, the twister-arms are approximated to one another, as indicated with the tie in Fig. 16, to loop the tie about the neck $e^4$ of the bag. This is effected by the contact with the forward end of the tube $k'$, of a block $g^3$ which is fitted to slide upon the shank in the rear of the head $f'$ upon which the jaws are pivoted.

The twister arms $g$ have backwardly extending arms $f^2$ connected to the block by links $g^2$, and a spiral spring $f^4$ draws these arms normally together. The spring-pressure serves to distend the arms $g$ and studs $f$ when the tie is thereon, as shown in Fig. 14, and the degree of extension is regulated by screws $f^3$ fitted in the arms $f^2$ to contact with the head $f'$. The arms $f^2$ are adjusted to set the jaws $f$ at a distance apart a little greater than the length of the tie, and the lower hubs $d^3$ of the delivery-screws $d'$ are tapered so that when the arms are lifted between them, as shown in dotted lines $g$ in Fig. 6, they are crowded together to draw the studs $f$ beneath the centers of the guides $d$. The studs are formed with a contracted neck and tapering point, which facilitates the dropping of the ties thereon when the studs are in this position. When the tie is released from the grooves $d^2$, the twister-arms are lowered and the ends of the arms spring outwardly into notches $e^5$ in the hubs $d^3$ to produce tension upon the tie. Such outward expansion of the fork-arms is effected by the springs $f^4$ (see Fig. 14) and stretches the tie $b$ tightly upon the necks of the jaw-studs. The tie is thus held firmly while the fork-arms are lowered and retracted to loop the tie about the bag-neck.

Before the twisting of the ties commences, the fork-arms are crowded together, as shown in Figs. 15 and 16, by the backward movement of the shank $g'$, which crowds the block $g^3$ against the end of the tube $k'$, thus looping the tie about the neck of the bag and holding the loops $b'$ upon the ties sufficiently separated, as shown in Fig. 14$^a$ to facilitate the untwisting of the tie when the bag is to be opened.

With the construction shown, the twisting mechanism lies close to the table during the twisting operation, and a depression F' is therefore formed in the table to clear the rotating fork-arms, as indicated in Figs. 2 and 4. The twister mechanism is thus entirely automatic in its reception of the ties and twisting them upon the bag-neck.

The carrier-ring E is rotated one step after the tying of each bag, and the notch $e$ carrying the tied bag is gradually moved to a position where an ejector $j$ operates to push the tied neck from the notch, thus completing the operation of the machine upon the bag. The ejector $j$ is shown as a lever-arm hinged to move outwardly across the ring E and reciprocated by a link $i$ which connects it with a crank-arm upon the rock-shaft $r$. The ejector is thus operated each time that the shaft rocks forwardly to lower the tube $k'$.

The tie-deliverer is supplied with ties from an elevated coil of ties shown in Fig. 1, by a spiked roller $c$. The spikes $c^5$ are shown in Fig. 1 supporting the ties and certain of the ties which have been dropped from the spikes lying upon the guides $d$ in readiness to engage the top coil of the delivery-screws.

A plate $d^5$ is shown in Fig. 6 secured upon the top of each delivery-screw and adjusted at a suitable distance from the bottom of the groove $d^2$ to admit only a single tie, thus operating, as the screws revolve, to separate one tie from those upon the guides and carry it downwardly for delivery. Each rotation of the screws thus separates an additional tie and carries it downward.

Provision is made to rotate the feed-roller $c$ as the ties upon the guides move downwardly and to arrest such rotation as long as the guides are supplied with the ties. This is effected by connecting the link $t$ which moves the pawl upon the ratchet-wheel $c'$, with a pivoted dog $t'$ having a notch $u$ to engage a pawl $u'$ upon an oscillating lever $u^2$. The lever $u^2$ is actuated at each vibration of the rock-shaft $r$ by a link-connection with an arm $r^{20}$ thereon. The pawl $u'$ is pressed normally into the notch $u$ by a spring $u^3$, and has a bent finger $t^2$ projected toward the ties $b$ as they move downwardly upon the guides. The arm $u^2$ is shown in its forward position in Fig. 5 and in its backward position in Fig. 4. The oscillation of the arm $u^2$ tends, through the pawl $u'$ and dog $t'$, to turn the ratchet-wheel upon the feed-roller $c$ step by step, but the finger $t^2$ is so proportioned that in the forward movement of the arm $u^2$ it collides with the ties $b$ if the guide is filled with such ties, and the further feeding of the ties from the feed-roll is arrested because the continued movement of the lever $u^2$ pulls the pawl away from the notch $u$, as shown in Fig. 5, so that upon the reverse movement of the lever the dog remains motionless. The turning of the feed-roller is thus prevented at each oscillation of the lever $u^2$ until the ties move downwardly from the path of the finger $t^2$, which permits such finger to make its full movement, as indicated by the dotted lines $t^2$ in Fig. 4.

Provision is made to arrest the rotation of the feeding appliance in case the notch $e$ in the carrier is not supplied with a bag-neck when such notch reaches the location of the twister. This is shown in Figs. 2 and 4, as a finger $z$ attached to a rock-shaft $z'$ upon the stand $B^3$, and having a detent $z^2$ extended in the path of a pin $y$ projected from the shaft N'. The detent $z^2$ is drawn upwardly by a spring $z^4$ and held normally in the path of the pin $y$ which is shown in Fig. 2 in position to engage the detent, and in Fig. 4 moving clear of the detent. In Fig. 4, the detent is shown in the position to which it is moved by the operation of the bag-neck $e^4$ upon the finger $z$, pushing the finger backwardly and the detent outwardly to clear the pin $y$. The finger stands so close to the bag-neck during the tying operation that it does not interfere with the rotation of the twister, but when the bag-neck moves away from the finger it presses forwardly into the position indicated by the dotted lines $z$ in Fig. 4, for throwing the detent into the path of the pin $y$, as is evident by inspection of Fig. 4. The movement of each bag-neck to the twisting position holds the detent out of engagement with the pin $y$ during the twisting operation, thus permitting the feeding device to deliver a wire-tie to the jaws of the twister. The cord is connected conveniently with the guides $d$ by a hole extended into the top of the guide and outwardly through an outlet $b^4$ in the side of the same. The cord is cut off at the outlet, as it is drawn downwardly from time to time by the uncoiling of the assemblage of ties where it is supported above the feed-roll $c$. The cord may be knotted at the outlet $b^4$ to retain it in the guide, but it is preferable to employ a cam $b^5$ pivoted upon the guide at the outlet to clamp the cord when adjusted.

The shaft N' which drives the delivery-screws $d'$ lies at one side of the screws, and a similar shaft P is journaled at the opposite side of the same, as shown in Fig. 2, and connected thereto by gear-wheels $p$, and the shaft P is shown connected by sprocket wheels $n$, countershaft $p^3$ and chains $n^2$ with a sprocket-wheel $n^3$ upon the driving-shaft L. This rotates continuously the wheel $n$, which rides loosely upon the shaft P.

To prevent injury to the delivering mechanism in case the ties become jammed in the cheeks $e^4$ or in the grooves of the delivery-screws, the wheel $n$ is connected with the shaft P by a spring-clutch which yields if such obstruction arises, thus leaving the shaft P stationary. This clutch is shown as a spring-pin $q$ mounted in a disk $n'$ upon the wheel $n$, and a hub $p'$ upon the shaft P having a tooth with sloping face to engage the end of the spring-pin. The wheel $n$ thus drives the delivery-screws until obstruction arises, when the spring-pin yields and the wheel turns without rotating the shaft.

Brush-wheels $o'$ are shown in Figs. 2, 3, 6 and 7 secured upon the shafts N' and P, and operate upon the ties $b$ (just above the tops of the delivery-screws) to work them downward gently toward the plates $d^5$, which engage the ends of the ties singly and draw them into the grooves of the screws.

These means for handling the wire-ties are of material assistance, as the ties are exceedingly light and their weight alone cannot be depended upon to feed them directly, or to keep them in a level position, but the means described operates effectively for such purpose.

With the apparatus thus far described, the operator pushes the open mouth of the bag in flat form into the crimper until it is wholly past the pusher $a^3$ in its retracted position. The pusher is then operated automatically to drop in behind the bag and force it into the notch $e$ in the carrier. The carrier is then turned automatically, the guard E' keeping the bag-necks in the notches until they approach the tying position, when the arms $g$ with a tie $b$ are lowered to the level of the carrier and pulled backwardly as shown in Fig. 16, to loop and twist the tie around the bag-neck. When the tie is fully twisted as shown in Fig. 3, the entire twister is moved laterally to withdraw the studs $f$ from the eyes $b^2$, thus clearing the twister from the twisted tie and leaving it free to be raised to the position shown in full lines in Fig. 4, to receive another tie from the feeding devices. At the close of the twisting operation, the spindle $g'$ is wholly retracted, and the closing of the fork-arms by the gradual drawing of the block $g^3$ against the end of the tube $k'$ brings the studs finally into the middle of the eyes $b^2$, as shown in Fig. 16, so as to readily clear the eyes when the studs are withdrawn therefrom. To prevent the eyes of the ties from slipping off of the studs during the looping of the tie about the bag-neck $e^4$, as shown in Fig. 16, a notched guard-plate $x$ may be applied to the ends of the arm $g$ as shown in Figs. $2^a$ and $2^b$. Such guard-plate is shown attached by a foot-piece $x'$ to the end of the fork-arm $g$, far enough from the stud $f$ to permit the eye $b^2$ of the wire-tie to fall upon the stud; but so near that the wire adjacent to the eye may slip into the notch as the fork-arms draw the tie backwardly to loop it upon the bag-neck $e^4$, as shown in Fig. $2^c$.

The engagement of the wire with the notched guard $x$ is apparent in Figs. $2^b$ and $2^c$, and keeps the wire down upon the studs $f$ until the tie is fully twisted, as shown in Fig. 3, when the winding of the wires together withdraws them from the guards, so that when the twister is moved laterally the guards do not interfere with the escape of the studs from the eyes $b^2$ so as to wholly clear the tie.

The notched guards $x$ are shown only in Figs. $2^a$ to 3 inclusive, and if they were shown in Fig. 16 would throw the necks of the tie adjacent to the eyes $b^2$ a little closer together. The notched guard $x$ is not essential to the operation of the twister; but renders its action more positive as it will be understood that in the rotary movements of the twister the studs $f$ move in opposite directions in relation to the eye $b^2$, one of them pushing into the eye during such rotation and the other tending to pull out of the same. Such stud is shown with a neck in which the tie is held by the expansion of the arms $g$ under the influence of the spring $f^4$ shown in Fig. 14, and such expansive force is sufficient in most cases to hold the tie securely upon the studs. The succeeding movements of the carrier transport the tied bag to the ejector $j$ which automatically forces it from the carrier, thus completing the operation of the machine.

The apparatus so far described suspends the bag by its neck in the notch of the carrier; but where filled bags are to be tied they need support by an auxiliary carrier, which it is obvious could be made to rotate with the carrier E; but in Fig. 19 I have shown a carrier formed of cars U movable upon a straight track U' past the tying device, at which the tie-twister operates to tie the neck of the bag.

The cars are shown each with a column V having bag-holder V' at the top adapted to receive the crimped neck of the bag, the filled bag V² resting upon the car, as shown in Fig. 19.

Figs. 19 and 20 illustrate means of tying the necks with a circular ring-tie $b^6$. The ties would be fed from a cord or feed-rod $d^6$ to a single cylindrical guide $d^7$ upon which the rings would move loosely downward. Such a guide would be furnished with notches $e^3$ like the guides $d$ in Fig. 6, and would be supported during the entire downward movement of the ties by three of the delivery-screws $d'$ having segmental collars $e^2$ fitted to the grooves $e^3$ in the guide. The screws $d'$ would be supported in casings like the casing $d'$ in Fig. 6, and geared together by suitable gearing as are the screws in that figure. A plurality of the collars $e^2$ upon each of the screws $d'$ enables one or more of them to support the guide at all times while the ties are moved downward thereon by engagement with the spiral grooves $d^2$. These spiral grooves in the three delivery-screws would receive and sustain the circular ties $b^6$ at three points, and simultaneously discharge them upon the bag-neck; which is indicated by dotted lines $e^4$ in Fig. 20, below the guide $d'$. The ring-tie when dropped upon the bag-neck would be pulled backwardly and twisted by a plain flat hook $w$ formed upon the spindle $g'$, thus closing the tie as shown in Fig. 22 and leaving a flat finger-piece $b^7$ for untwisting the tie when required.

From the above description it will be seen that the invention is not confined to a particular construction for the mechanism by which the bag-neck is crimped, the wire-tie delivered to the neck of the bag and twisted thereon, provided these devices are connected by mechanism which operates them automatically in the proper order.

So far as the bag-tying devices are concerned, it is not material whether the bag be first delivered to a carrier and then transported to the tying devices, as it is obvious that the crimper may, if preferred, be located in front of the tying devices and deliver the bag-neck directly thereto, and I have therefore claimed the means for tying the bag, irrespective of the means by which the bag-neck is delivered to the tying devices.

Having thus set forth the nature of the invention what is claimed herein is:

1. In a bag-tying machine, the combination of the following instrumentalities operating successively, first, means operating above the socket for looping a straight wire-tie around the neck of the bag and projecting both ends of the tie at one side of the neck; second, a twister operated to grasp the two ends of the tie simultaneously and hold them separate from one another, and third, means for rotating the twister to twist the ends of the tie together with engaging coils, and the terminals of the tie diverging to be readily untwisted by the fingers.

2. In a bag-tying machine, the combination, of means for looping a wire-tie around the neck of the bag, a twister adapted to separately grasp the two ends of the tie, means for pulling the tie toward one side of the bag-neck, and means for rotating the twister to twist the ends of the tie together.

3. In a bag-tying machine, the combination, of means for delivering individual wire-ties adjacent to the bag-neck, means for looping the wire-tie around the neck of the bag, means for twisting the ends of the tie together, and mechanism operating the several means successively.

4. In a bag-tying machine, the combination, of means for moving the carrier with the bag-neck to a twister, means for delivering an individual wire-tie adjacent to the bag-neck and twister, means for looping the wire-tie around the neck of the bag, means for twisting the ends of the tie together, and connected mechanism for operating the several means successively.

5. In a bag-tying machine, the combination, of means for moving the carrier to shift the bag-neck to a twister, means for delivering an individual wire-tie adjacent to the bag-neck and twister, means for looping the wire-tie around the neck of the bag, means for twisting the ends of the tie together, and connected mechanism for operating the several means successively.

6. In a bag-tying machine, the combination, of means for moving the carrier intermittingly, a stationary support adjacent to the path of the carrier, means upon such support for feeding a wire-tie adjacent to the bag-neck, and means upon such support for twisting the tie upon the bag-neck.

7. In a bag-tying machine, the combination, with a stationary support adjacent to the path of the carrier, such support having means for delivering wire-ties adjacent to the bag-neck, of means for supplying wire-ties by gravity to such tie-deliverer, means for grasping each tie and twisting it upon the bag-neck, and mechanism operating such means successively.

8. In a bag-tying machine, the combination, of means for successively delivering straight wire-ties at one side of the bag-neck, means for looping the tie around the neck and projecting both ends of the tie at one side thereof, a twister operated to grasp the ends of the tie simultaneously, and means for rotating the twister to twist the ends of the tie together.

9. In a bag-tying machine, the combination of delivery-screws engaging a series of wire-ties at different points upon such ties, means for rotating the delivery-screws to discharge the wire-ties successively, and a twister constructed and arranged to engage the ties singly as they are delivered, and operating to twist them upon the bag-neck.

10. In a bag-tying machine, the combination, with a delivery-device for wire-ties comprising a plurality of screws having threads adapted to engage the tie at several points, of means for delivering the ties to the upper ends of the screw-threads, means for rotating the screws in unison to discharge the entire tie from the several threads simultaneously, and a twister constructed and arranged to engage the ties singly as they are delivered and operating to twist them upon the bag-neck.

11. In a bag-tying machine, the combination, with a delivery-device for wire-ties comprising a plurality of screws having threads adapted to engage the tie at several points, of guides adjacent the sides of the screws with means for supplying the ties to such guides, the guides having transverse notches and the screws having annular ribs to engage such notches and thus support the guides, means for rotating the screws in unison, and a twister constructed and arranged to engage the ties singly as they are delivered and operating to twist them upon the bag-neck.

12. In a bag-tying machine, the combination, with two delivery-screws having similar spiral grooves adapted to receive the looped ends of straight wire-ties, guides supporting such looped ends of the ties adjacent to the screws, means for rotating the screws in unison to discharge both loops of the tie from the grooves simultaneously, means for grasping the looped ends of the tie and drawing it toward one side of the bag-neck, and means for twisting the ends together upon the opposite side of the neck.

13. In a bag-tying machine, the combination, with means for successively delivering wire-ties, of a tie-twister having a shank, a spiral-spindle coupled detachably to the shank, a tube inclosing said spindle and fitted loosely upon the said shank and having a hinge at its farther end, a nut fitted to slide upon the spiral spindle within the tube, means for reciprocating the nut, and means for lifting the forward end of the tube to raise the twister into engagement with the wire-tie.

14. In a bag-tying machine, a tie-twister having a shank, a spiral spindle coupled detachably to the shank, a tube inclosing said spindle and shank and slotted at the sides, a nut fitted to slide upon the spiral-spindle within the tube, links for reciprocating the nut, and means to prevent the rotation of the shank at the beginning of the reciprocating movement.

15. In a bag-tying machine, a tie-twister having a shank, a tube having the shank fitted movably thereto and slotted in opposite sides, a feather engaging the tube and shank for a definite distance, a spiral-spindle coupled detachably to the shank within the tube, a nut fitted to slide upon the spindle and reciprocating within the tube, and links connected with the nut and operating to first retract the shank and then to rotate the same.

16. In a bag-tying machine, the combination, with means for twisting a wire-tie, of a gravity tie-feeding device comprising a plurality of guides having a cord or wire extended upwardly from each and ties strung upon the said cords, a roller pressed against the cords above the said guides, and means for rotating the roller at intervals to discharge the ties successively.

17. In a bag-tying machine, the combination, with means for twisting a wire-tie, of a gravity feeder for straight ties having loops at their ends, comprising guides disposed to receive the said loops, a cord or wire extended upwardly from each guide with the loops of the ties strung thereon, a spiked roller pressed against the cord above the said guides, and means for intermittingly rotating the spiked roller to discharge the ties successively to the guides.

18. In a bag-tying machine, the combination, with means for twisting a wire-tie, of a gravity feeder for straight ties having loops at their ends, comprising guides disposed to receive the said loops, a cord or wire extended upwardly from each guide with the loops of the ties strung thereon, a roller pressed against the cords above the said guides, a ratchet for turning the roller, a toothed dog connected to such ratchet, an oscillating arm having a pawl to engage the said dog, and a finger extended from such pawl into the path of the ties as they move downward upon the guides, and operating to detach the pawl from the dog and prevent the rotation of the roller, so long as the ties upon the guides engage the said finger.

In testimony whereof I have hereunto set my hand in the presence of two subscribing witnesses.

JOHN P. CURRY.

Witnesses:
L. LEE,
THOMAS S. CRANE.